United States Patent Office
3,299,055
Patented Jan. 17, 1967

3,299,055
DITHIOLIUM COMPOUNDS AND PREPARATION
Erwin Klingsberg, Mountainside, N.J., assignor to American Cyanamid Company, Stamford, Conn., a corporation of Maine
No Drawing. Filed Aug. 2, 1963, Ser. No. 299,474
3 Claims. (Cl. 260—240)

The present invention relates to, and has as its object, the provision of methine bis-dithiolium compounds which are useful as dyes for polymeric substrates having anionic sites.

More particularly, the present invention relates to methine bis-dithiolium compounds of the Formula I:

$$[D^+-CH=D']X^- \quad (I)$$

wherein D and D' each represent a 1,2-dithiolium or a 1,3-dithiolium radical and X represents an anion of an acid with a pKa below 4. If desired, both may be non-condensed, and they may be the same, or dissimilar. But at least one of the D moieties must be a monocyclic radical (i.e., a non-condensed 1,2- or 1,3-dithiolium ring, which, however, may have cyclic substituents such as phenyl) to be a stable, isolatable compound within the scope of this invention. When both D radicals are condensed dithiolium rings (i.e., benzodithiolium rings), the compounds spontaneously decompose eliminating acid and, thus, cannot be isolated.

The dithiolium nuclei corresponding to the D radicals have the following structures:

1,2-dithiolium     1,3-dithiolium wherein R and R', taken individually, are hydrogen, phenyl or di-lower alkylaminophenyl; or together form a benzo ring. While the D nuclei were each positively charged in their respective parent dithiolium compounds, only one positive charge is found in the bis-derivatives of the present invention. This positive charge resonates between the two nuclei; and it is probably this charge resonance which is responsible for the deep color exhibited by the compounds. Because of resonance, each compound exists in two distinct forms as follows:

$$[D^+-CH=D' \rightleftharpoons D=CH-D'^+]X^-$$

This can be specifically exemplified for the compound of Example 8 as follows:

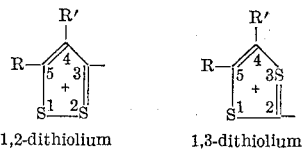

(a)           (b)

As will be noted, in (a) the positive charge is in the 1,3-dithiolium nucleus whereas in (b) it is in the 1,2-dithiolium nucleus. Hereinafter, while both resonance forms are intended, for purposes of brevity, only one will be shown.

The compounds of Formula I are prepared by the reaction of a methylthiodithiolium salt with a methyldithiolium salt as represented in the following equation:

$$[D^+-CH=D]X^-+CH_3SH+HX$$

The reaction is conveniently performed in an organic polar solvent such as an alcohol (e.g., a lower alkanol) or nitromethane, at temperatures between room temperature and the reflux temperature of the solvent. The course of the reaction is readily followed by the development of the intense color of the product, which may be isolated by filtration. The product may be purified by conventional crystallization methods. They give strong red to violet dyeings on polyacrylonitrile fiber when applied by conventional acid dyeing techniques. Besides polyacrylonitrile, they dye other substrates which have anionic sites, e.g., protein or modified polyester fibers.

Methylthiodithiolium compounds which may be used in the foregoing reaction are represented by the following formulae:

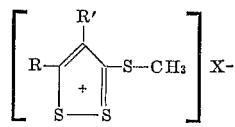

and

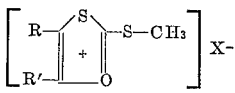

Methyldithiolium compounds which may be used in this reaction are represented by the following formulae:

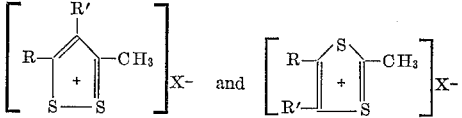

The R, R' and X symbols are as defined above.

These starting materials have been previously described and are prepared by known procedures. The 3-methylthio-1,2-dithiolium and 2-methylthio-1,3-dithiolium compounds are described in the literature; for example, see J.A.C.S. 84, 2941 (1962). 3-Methyl-1,2-dithiolium and 2-methyl-1,3-dithiolium compounds are described in J. Chem. Soc. 1962, 5104.

The nature of the salt-forming anion "X" is not critical either with regard to the preparation or the properties of the compounds of this invention.

In general, salts can be formed of anions derived from any acid with a pKa value below 4. Examples of such acids are hydrochloric, hydrobromic, hydriodic, sulfuric, dichloro and trichloracetic, maleic, p-toluenesulfonic, naphthalenesulfonic, perchloric, picric and o- and p-nitrobenzoic acid.

This invention is illustrated in the following examples.

*Example 1*

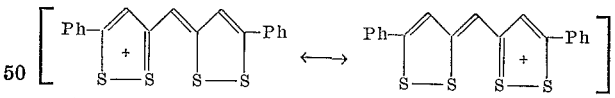

A mixture of 1.9 g. of 3-methylthio-5-phenyl-1,2-dithiolium methosulfate and 1.1 g. of 3-methyl-5-phenyl-1,2-dithiolium chloride is warmed in 60 ml. alcohol on the steam bath for one-half hour, chilled and filtered. The violet product, M.P. 230°, is a mixture of the chloride and methosulfate of the methine-bis-diothiolium dye. It gives violent dyeings on polyacrylonitrile fiber when applied by the usual technique from an aqueous bath containing a few percent of acetic acid on the weight of the fiber.

Alcoholic solutions of the dye thus prepared are readily converted to the corresponding perchlorate, dec. 232°, or bromide, M. 212° dec., by the respective addition of perchloric or hydrobromic acid.

*Example 2*

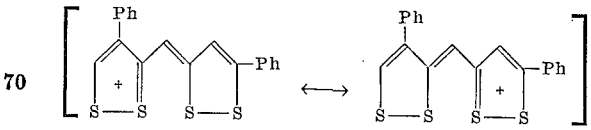

A mixture of 0.65 g. of 3-methyl-5-phenyl-1,2-dithiolium chloride and 1.20 g. of 3-methylthio-4-phenyl-1,2-dithiolium iodide in 50 ml. of alcohol is refluxed and stirred for twenty minutes, chilled, and filtered, yielding 1.30 g. of product, M. 150° dec. It may be purified by crystallization from acetic acid. It dyes polyacrylonitrile in deep violet shades when applied by the usual technique from an aqueous bath containing a few percent of acetic acid on the weight of the substrate.

*Example 3*

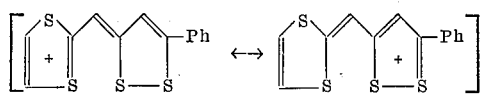

A mixture of 0.75 g. of 2-methylthio-1,3-dithiolium iodide and 0.54 g. of 3-methyl-5-phenyl-1,2-dithiolium chloride in 25 ml. of alcohol is warmed one hour on the steam bath, yielding 0.52 g. of violet product, M. 163°.

*Example 4*

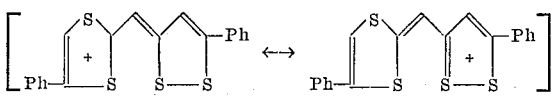

Equimolecular amounts of 3-methylthio-5-phenyl-1,2-dithiolium methosulfate and 2-methyl-4-phenyl-1,3-dithiolium perchlorate are reacted in refluxing ethanol to give the violet dye.

*Example 5*

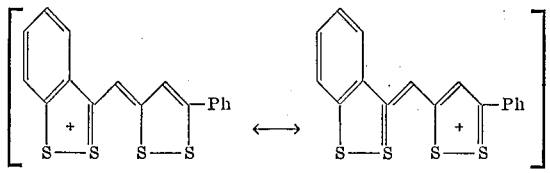

A mixture of 0.80 g. of 3-methylthio-4,5-benzo-1,2-dithiolium iodide and 3-methyl-5-phenyl-1,2-dithiolium chloride in 25 ml. of ethanol is warmed on the steam bath for 45 minutes, cooled, and filtered, yielding a deep purple product.

*Example 6*

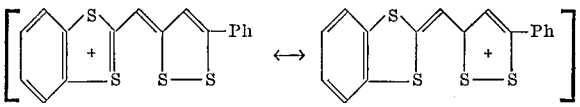

Equimolecular quantities of 2-methylthio-4,5-benzo-1,3-dithiolium iodide and 3-methyl-5-phenyl-1,2-dithiolium chloride react readily in refluxing alcohol, giving a violet dye.

*Example 7*

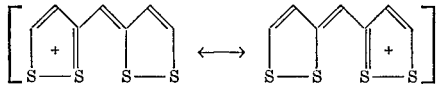

Equimolecular quantities of 3-methylthio-1,2-dithiolium iodide and 3-methyl-1,2-dithiolium iodide react readily in warm ethanol to give the reddish violet product.

*Example 8*

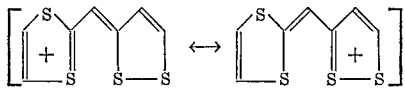

Equimolar quantities of 2-methylthio-1,3-dithiolium iodide and 3-methyl-1,2-dithiolium iodide react readily in warm ethanol to give the red-violet dye.

*Example 9*

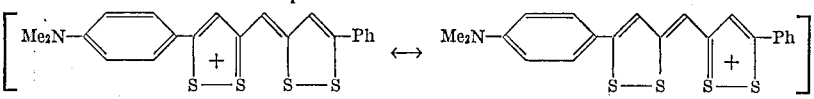

Equimolecular amounts of 3-methylthio-5-(p-dimethylaminophenyl) - 1,2 - dithiolium iodide and 3-methyl-5-phenyl-1,2-dithiolium chloride react readily in alcohol on the steam bath, giving a deep violet product.

*Example 10*

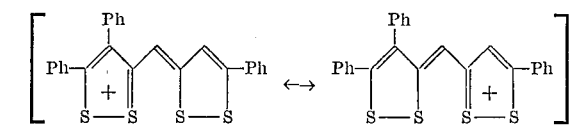

A mixture of 1.00 g. of 3-methylthio-4,5-diphenyl-1,2-dithiolium iodide and 0.50 g. of 3-methyl-5-phenyl-1,2-dithiolium chloride in 25 ml. of ethanol is warmed on the steam bath for an hour, chilled, and filtered, yielding a deep purple dye.

I claim:
1. A compound of the formula:

$$[D^+\text{---}CH=D']X^-$$

wherein D and D' individually represent members selected from the group consting of 1,2-dithiolium, 1,3-dithiolium, benzo-1,2-dithiolium and benzo-1,3-dithiolium, at least one of D and D' being monocyclic, said D and D' radicals each having up to two substituents selected from the group consisting of phenyl and di-lower alkylaminophenyl; and X is the anion of an acid having a pKa below 4.

2. A compound of the formula:

$$[D^+\text{---}CH=D']X^-$$

wherein D and D' individually represent members selected from the group consisting of 1,2-dithiolium, 1,3-dithiolium, benzo-1,2-dithiolium and benzo-1,3-dithiolium, at least one of D and D' being monocyclic, said D and D' radicals each having up to two substituents selected from the group consisting of phenyl and di-lower alkylaminophenyl; and X is an anion selected from the group consisting of chloride, bromide, iodide, acid sulfate, dichloroacetate, trichloroacetate, maleate, p-toluenesulfonate, napthalenesulfonate, perchlorate, picrate, o-nitrobenzoate and p-nitrobenzoate.

3. A process for the preparation of a compound of the formula:

$$[D^+\text{---}CH=D']X^-$$

wherein D and D' individually represent members selected from the group consisting of 1,2-dithiolium, 1,3-dithiolium, benzo-1,2-dithiolium and benzo-1,3-dithiolium, at least one of D and D' being monocyclic, said D and D' radicals each having up to two substituents selected from the group consisting of phenyl and di-lower alkylaminophenyl; and X is the anion of an acid having a pKa below 4;

which comprises the step of reacting equimolar amounts of (a) a methylthiodithiolium compound selected from the group consisting of:

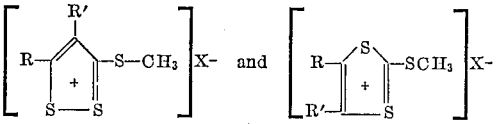

(b) a methyldithiolium compound selected from the group consisting of:

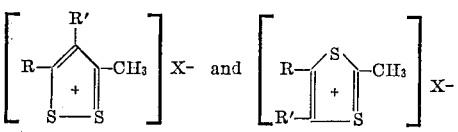

wherein R, R' and X are as defined above, said reaction being conducted at a temperature between room and reflux in a solvent selected from the group consisting of a lower alkanol and a lower nitroalkane.

References Cited by the Examiner
UNITED STATES PATENTS 2,748,115 5/1956 Brooker et al. __ 260—240.7 X
3,211,748 10/1965 Wizinger et al. _____ 260—327

OTHER REFERENCES

Klingsberg et al.: J. Am. Chem. Soc., vol. 84, pages 2941–2944 (1962).

Soder et al.: Helv. Chim. Acta., vol. 42, pages 1779–1785 (1959).

JOHN D. RANDOLPH, *Primary Examiner.*